US012603560B2

(12) United States Patent
Yonemori

(10) Patent No.: US 12,603,560 B2
(45) Date of Patent: Apr. 14, 2026

(54) VEHICLE DRIVE SYSTEM

(71) Applicant: Mazda Motor Corporation, Hiroshima (JP)

(72) Inventor: Kei Yonemori, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 238 days.

(21) Appl. No.: 18/660,376

(22) Filed: May 10, 2024

(65) Prior Publication Data

US 2024/0388187 A1    Nov. 21, 2024

(30) Foreign Application Priority Data

May 15, 2023    (JP) ................................. 2023-080421

(51) Int. Cl.
H02K 21/46        (2006.01)
H02K 1/276        (2022.01)
H02K 11/25        (2016.01)

(52) U.S. Cl.
CPC ............. H02K 21/46 (2013.01); H02K 1/276 (2013.01); H02K 11/25 (2016.01)

(58) Field of Classification Search
CPC ........ H02K 17/26; H02K 21/46; H02K 1/276; H02K 11/25; H02K 2213/09; H02K 1/27; H02K 17/16; H02K 17/168; H02K 1/2706

USPC .................. 310/156.77, 156.78, 156.81, 211
See application file for complete search history.

(56) References Cited

U.S. PATENT DOCUMENTS

| | | | | |
|---|---|---|---|---|
| 4,139,790 A | * | 2/1979 | Steen | ..................... H02K 21/46 310/212 |
| 4,506,181 A | * | 3/1985 | Jones | ..................... H02K 1/276 310/211 |
| 4,568,846 A | * | 2/1986 | Kapadia | ................. H02K 21/46 310/156.83 |

FOREIGN PATENT DOCUMENTS

JP        2000-178840 A        6/2000

* cited by examiner

*Primary Examiner* — Alexander A Singh
(74) *Attorney, Agent, or Firm* — XSENSUS LLP

(57)        ABSTRACT

A vehicle drive system includes a motor that has a cylindrical stator and a cylindrical rotor provided in the stator to be coaxially rotatable with a center axis of the stator and drives a front wheel of a vehicle by rotation of the rotor. The rotor has a cage section and a permanent magnet section provided on an inner circumferential side of the cage section and formed of a rare earth magnet. The vehicle drive system further includes a controller that executes a synchronous operation mode when a temperature of the permanent magnet section is lower than a predetermined temperature, and executes an asynchronous operation mode when the temperature of the permanent magnet section is equal to or higher than the predetermined temperature. In the synchronous operation mode, the rotor is rotated by using a magnetic force of the permanent magnet section.

9 Claims, 12 Drawing Sheets

VEHICLE DRIVE SYSTEM

CROSS-REFERENCE TO RELATED APPLICATION

The present application claims priority to Japanese Patent Application 2023-080421, filed May 15, 2023, the entire contents of which are incorporated herein by reference.

BACKGROUND

Field

The present disclosure relates to a vehicle drive system and, in particular to, a vehicle drive system that is applied to a vehicle traveling using a motor as a drive source.

Description of the Related Art

Conventionally, it has been known to use motors to drive various types of machines. For example, a drive motor for spinning machinery is disclosed in Patent document 1. The drive motor for the spinning machinery includes a stator, a rotor disposed on an inner circumferential side of the stator, a cage section provided to the rotor, and a permanent magnet section provided on an inner circumferential side of the case section in the rotor. The drive motor for the spinning machinery is used to drive a spindle holding a bobbin around which thread is wound.

PRIOR ART DOCUMENTS

Patent Documents

[Patent document 1] JP-A-2000-178840

SUMMARY

By the way, permanent magnet motors are frequently employed as vehicle drive motors mounted on electric cars and the like. Since the permanent magnet motor can generate maximum motor torque instantaneously in a low motor speed range, there is an advantage of ensuring vehicle startability from a stationary state. However, since a back electromotive force (EMF) generated in the permanent magnet motor is increased in a high motor speed range, the motor torque may become insufficient during high-speed travel, for example. For this reason, such a vehicle drive motor has been requested that can generate the required motor torque for driving the vehicle from the low to high motor speed range.

Thus, as the vehicle drive motor, it is considered to use the drive motor for the spinning machinery as disclosed in Patent document 1 that includes the rotor, and the rotor has the permanent magnet section capable of generating the maximum motor torque in the low speed range, and the cage section unaffected by the back EMF in the high speed range.

However, in the motor as disclosed in Patent document 1, since the permanent magnet section is disposed on the inner circumferential side of the cage section in the rotor, the permanent magnet section is positioned on the inner circumferential side of the rotor when compared to that in a general permanent magnet motor. Thus, heat accumulation tends to occur in the permanent magnet section. For this reason, when an eddy current is generated in the permanent magnet section due to a rotating magnetic field of the stator, a temperature of the permanent magnet section is likely to become higher than that in the general permanent magnet motor. Here, in the case where the permanent magnet section is formed of a rare earth magnet, irreversible demagnetization occurs when the temperature of the permanent magnet section becomes high due to the eddy current, which may make it difficult to generate the required motor torque for driving the vehicle.

The disclosure has been made in view of such a point, and an object thereof is to provide a vehicle drive system that includes a motor capable of suppressing demagnetization of a permanent magnet section.

Means for Solving the Problem

In order to achieve the above object, the following solution is implemented in the disclosure by a vehicle drive system including a motor that has a cylindrical stator and a cylindrical rotor provided in the stator to be coaxially rotatable with a center axis of the stator and that drives a drive wheel of a vehicle by rotation of the rotor.

More specifically, in a first aspect, the rotor has a cage section and a permanent magnet section provided on an inner circumferential side of the cage section and formed of a rare earth magnet. The vehicle drive system further includes a control section that executes a synchronous operation mode when a temperature of the permanent magnet section is lower than a predetermined temperature, and executes an asynchronous operation mode when the temperature of the permanent magnet section is equal to or higher than the predetermined temperature. In the synchronous operation mode, the rotor is rotated by using a magnetic force of the permanent magnet section. In the asynchronous operation mode, the rotor is rotated by using an induced current generated in the cage section.

A second aspect is that, in the first aspect, when the vehicle is traveling on an uphill road or a downhill road, the control section reduces the predetermined temperature to be lower than that when the vehicle is not traveling on the uphill road or the downhill road.

A third aspect is that, in the first or second aspect, the control section changes the predetermined temperature on the basis of a vehicle driving operation by a driver of the vehicle.

A fourth aspect is that, in the first or second aspect, when the temperature of the permanent magnet section becomes equal to or higher than the predetermined temperature in the synchronous operation mode, the control section switches the synchronous operation mode to the asynchronous operation mode.

A fifth aspect is that, in the first or second aspect, when the temperature of the permanent magnet section becomes lower than the predetermined temperature in the asynchronous operation mode, the control section switches the asynchronous operation mode to the synchronous operation mode.

In a sixth aspect, the rotor has a cage section and a permanent magnet section provided on an inner circumferential side of the cage section and formed of a rare earth magnet. The vehicle drive system further includes a control section that executes a synchronous operation mode when a temperature of the permanent magnet section is a first temperature, and executes an asynchronous operation mode when the temperature of the permanent magnet section is a second temperature that is higher than the first temperature. In the synchronous operation mode, the rotor is rotated by using a magnetic force of the permanent magnet section. In the asynchronous operation mode, the rotor is rotated by using an induced current generated in the cage section.

ADVANTAGES

In the first and sixth aspects, the asynchronous operation mode is executed when the temperature of the permanent magnet section is relatively high. In the asynchronous operation mode, a magnetic force of a rotating magnetic field of the stator is used to generate a secondary current (the induced current) in the cage section, which is located on an outer circumferential side of the permanent magnet section, and is unlikely to act on the permanent magnet section, which is located on the inner circumferential side of the cage section. That is, in the asynchronous operation mode, the magnetic force of the rotating magnetic field acting on the permanent magnet section is smaller than that in the synchronous operation mode. In this way, it is possible to suppress generation of an eddy current in the permanent magnet section. Thus, it is possible to suppress the permanent magnet section from reaching a high temperature and being demagnetized by the eddy current.

In the second aspect, when the vehicle is traveling on the uphill road or the downhill road, that is, in a situation where motor torque is relatively large and the motor is likely to generate heat, the predetermined temperature is set to be low. This facilitates execution of the asynchronous operation mode, in which the eddy current can be suppressed when compared to the synchronous operation mode, in a vehicle travel scene in which the temperature of the motor is likely to become high. Thus, it is possible to suppress the permanent magnet section from reaching the high temperature and being demagnetized by the eddy current.

In the third aspect, for example, the predetermined temperature is set to be low in a situation where a vehicle driving operation amount, such as an accelerator pedal operation amount, by the driver of the vehicle is relatively large and the motor torque can fluctuate rapidly. This facilitates the execution of the asynchronous operation mode, in which the eddy current can be suppressed when compared to the synchronous operation mode, in the vehicle travel scene in which the temperature of the motor is likely to become high. Thus, it is possible to suppress the permanent magnet section from reaching the high temperature and being demagnetized by the eddy current.

In the fourth aspect, when the temperature of the permanent magnet section is increased in the synchronous operation mode, the synchronous operation mode is switched to the asynchronous operation mode. As a result, the synchronous operation mode continues, and it is thus possible to suppress the permanent magnet section from reaching the high temperature and being demagnetized by the eddy current.

In the fifth aspect, when the temperature of the permanent magnet section is reduced in the asynchronous operation mode, the asynchronous operation mode is switched to the synchronous operation mode. In this way, it is possible to execute the synchronous operation mode, in which demagnetization of the permanent magnet section caused by the eddy current is suppressed and loss is suppressed when compared to that in the asynchronous operation mode.

BRIEF DESCRIPTION OF THE DRAWINGS

The scope of the present disclosure is best understood from the following detailed description of exemplary embodiments when read in conjunction with the accompanying drawings.

DETAILED DESCRIPTION

A detailed description will hereinafter be made on embodiments of the disclosure with reference to the drawings. However, the following description on the preferred embodiments is essentially and merely illustrative.

First Embodiment

Figure 1:
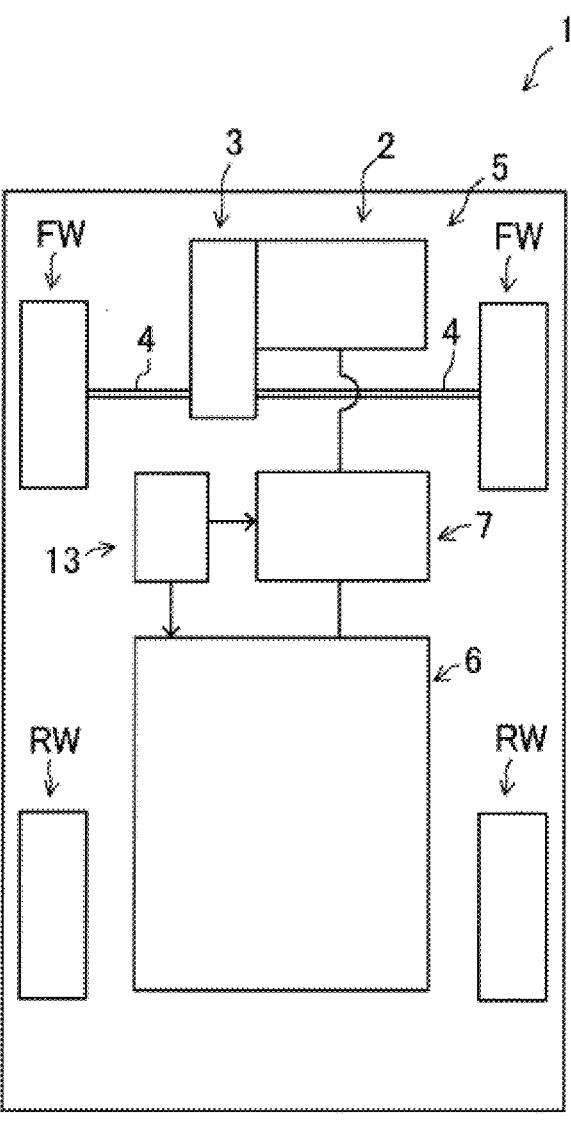
FIG. 1 is a plan view illustrating a schematic configuration of a vehicle on which a vehicle drive system according to a first embodiment of the disclosure is mounted.

FIG. 1 illustrates a vehicle 1 on which a vehicle drive system 5 according to a first embodiment of the disclosure is mounted. The vehicle 1 is an electric car of a front-wheel-drive type on which a motor 2 as a drive source is mounted. The vehicle 1 also includes a reduction drive 3, a right and left pair of driveshafts 4, a right and left pair of front wheels FW (drive wheels), and a right and left pair of rear wheels RW (driven wheels).

The motor 2 is disposed in a motor chamber and provided in a front portion of the vehicle 1. The motor 2 is coupled to each of the front wheels FW via the reduction drive 3 and the respective driveshaft 4. Thus, motor torque (a vehicle driving force) generated in the motor 2 is transmitted to the right and left front wheels FW via the reduction drive 3 and the right and left driveshafts 4, respectively.

Figure 2:
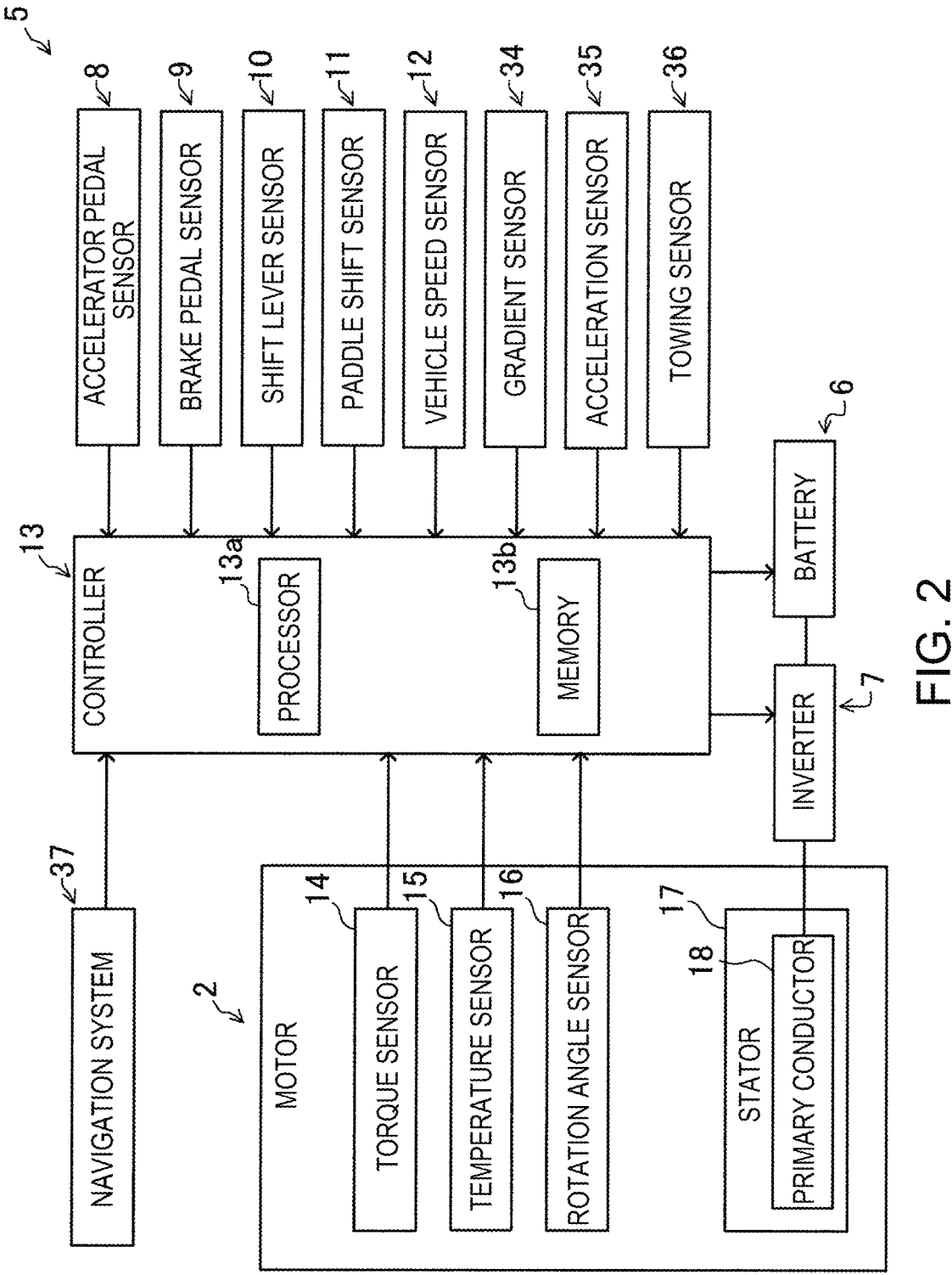
FIG. 2 is a block diagram illustrating the vehicle drive system.

Next, a description will be made on the vehicle drive system 5 mounted on the vehicle 1 with reference to FIG. 2.

The vehicle drive system 5 includes the motor 2, a battery 6, an inverter 7, an accelerator pedal sensor 8, a brake pedal sensor 9, a shift lever sensor 10, a paddle shift sensor 11, a vehicle speed sensor 12, a controller 13 (e.g., circuitry), a gradient sensor 34, an acceleration sensor 35, a towing sensor 36, and a navigation system 37.

The motor 2 includes a torque sensor 14, a temperature sensor 15, a rotation angle sensor 16, and a stator 17.

The torque sensor 14 is a sensor that can detect actual motor torque generated by the motor 2. The torque sensor 14 is configured to transmit detected actual motor torque information of the motor 2 to the controller/circuitry 13.

The temperature sensor 15 is a sensor (such as an infrared sensor) that can detect an actual temperature of a permanent magnet section 28 (see FIG. 3) of the motor 2. The temperature sensor 15 is configured to transmit detected actual temperature information of the permanent magnet section 28 to the controller/circuitry 13.

The rotation angle sensor 16 is a sensor (such as a resolver or an encoder) that can detect a rotation angle of a rotor 19 (see FIG. 3) of the motor 2. The rotation angle sensor 16 is configured to transmit detected rotation angle information to the controller/circuitry 13.

The stator 17 includes plural primary conductors 18. The plural primary conductors 18 are each electrically connected to the inverter 7.

The battery 6 is a lithium-ion battery, for example, and can store or discharge a DC current. The battery 6 is electrically connected to the motor 2 via the inverter 7.

The inverter 7 can convert the DC current to an AC current (such as a three-phase AC current) and vice versa. The inverter 7 can implement a mode in which the inverter 7 converts the DC current discharged from the battery 6 to the AC current and supplies the AC current to the motor 2 and a mode in which the inverter 7 converts the AC current (regenerative current) output from the motor 2 to the DC current and stores the DC current in the battery 6.

The accelerator pedal sensor 8 is a sensor that can detect a depression amount (an accelerator operation amount) of an accelerator pedal (not illustrated) by a driver of the vehicle 1. The accelerator pedal sensor 8 is configured to transmit detected accelerator pedal depression amount information to the controller/circuitry 13.

The brake pedal sensor 9 is a sensor that can detect a depression amount (a brake operation amount) of a brake pedal by the driver of the vehicle 1. The brake pedal sensor 9 is configured to transmit detected brake pedal depression amount information to the controller/circuitry 13.

The shift lever sensor 10 is a sensor (such as a range sensor) that can detect a position (a shift position) of a shift lever selected by the driver of the vehicle 1. In this embodiment, the driver can select any shift position from parking (a parking range), reverse (a reverse range), neutral (a neutral range), drive (a travel range), and manual (a manual range) by manually operating the shift lever. The shift lever sensor 10 is configured to transmit detected shift position information to the controller/circuitry 13. In this embodiment, in manual (the manual range), an operation information by the driver of the vehicle 1 to move the shift lever from a reference position to a vehicle front side (positive operation information) or an operation information by the driver of the vehicle 1 to move the shift lever from the reference position to a vehicle rear side (negative operation information) is transmitted to the controller/circuitry 13. In manual (the manual range), the shift lever is configured to return to the reference position when the driver of vehicle 1 takes his/her hand off the shift lever.

The paddle shift sensor 11 is a sensor that can detect an operation of a right and left pair of paddle shift switches provided on a steering wheel. The paddle shift sensor 11 is configured to transmit detected paddle shift switch operation information to the controller/circuitry 13. In this embodiment, operation information on the right paddle shift switch (positive operation information) or operation information on the left paddle shift switch (negative operation information) performed by the driver of the vehicle 1 is transmitted to the controller/circuitry 13.

The vehicle speed sensor 12 is a sensor (such as a wheel rotational speed sensor for the front wheels FW and the rear wheels RW) that can detect a speed of the vehicle 1. The vehicle speed sensor 12 is configured to transmit detected vehicle speed information to the controller/circuitry 13.

The controller/circuitry 13 is configured to control the motor 2, the battery 6, and the inverter 7 on the basis of the information received from each of the sensors. The motor 2 is configured to be controlled indirectly via the inverter 7.

The controller/circuitry 13 includes a processor 13a and a memory 13b that stores a control program. The controller/circuitry 13 is configured to control the motor 2, the battery 6, and the inverter 7 by executing processing in the control program stored in the memory 13b on the basis of the information that the processor 13a receives from each of the sensors.

The gradient sensor 34 is a sensor (an inclination sensor) that can detect a gradient of a road surface on which the vehicle 1 is traveling. The gradient sensor 34 is configured to transmit detected gradient information of the road surface (including whether the gradient is ascending or descending) to the controller/circuitry 13.

The acceleration sensor 35 is a sensor (such as a front/rear acceleration sensor) that can detect acceleration of the vehicle 1. The acceleration sensor 35 is configured to transmit detected acceleration information to the controller/circuitry 13.

The towing sensor 36 is a sensor that can detect whether the vehicle 1 is being towed (for example, a sensor that detects an operation status of a towing switch manually operable by the driver of the vehicle 1). The towing sensor 36 is configured to transmit detected towing information to the controller/circuitry 13.

The navigation system 37 includes a GPS sensor, a storage device that stores map information including the gradient information of the road surface, a display, a speaker, and the like, and is configured to guide a route from a current location to a destination set by the driver of the vehicle 1. The navigation system 37 is configured to transmit the gradient information of the road surface, on which the vehicle 1 is traveling, to the controller/circuitry 13.

Figure 3:
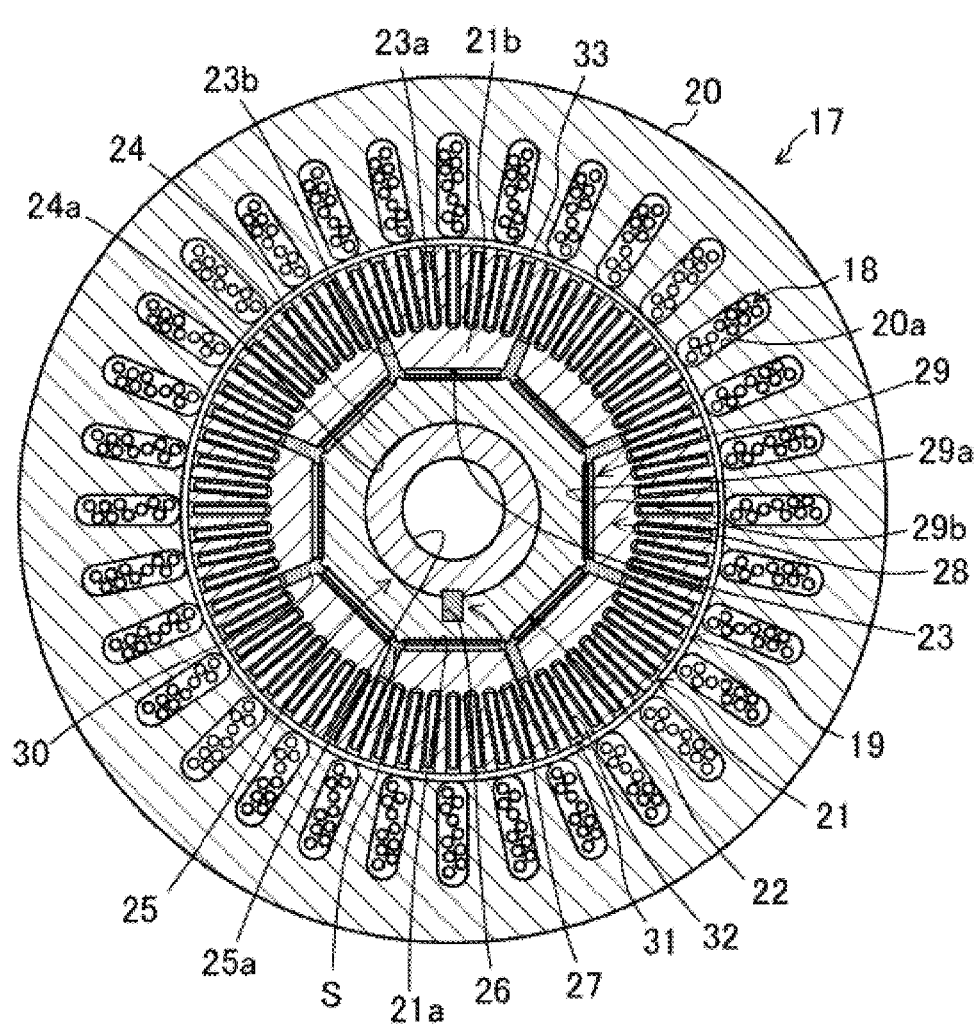
FIG. 3 is a schematic cross-sectional view illustrating a cross section in a radial direction of a motor.

Next, a detailed structure of the motor 2 will be described with reference to FIG. 3.

The motor 2 includes the substantially cylindrical stator 17 and the substantially cylindrical rotor 19 provided in the stator 17 to be coaxially rotatable with a center axis of the stator 17.

The stator 17 includes a stator core 20 and the plural primary conductors 18 (primary coils).

In the stator core 20, plural electromagnetic steel sheets, each of which is substantially ring-shaped, are stacked axially. The stator core 20 includes plural slots 20a, each of which is recessed radially outward from an inner circumferential surface of the stator core 20. The plural slots 20a are aligned along a circumferential direction at predetermined intervals. The plural primary conductors 18 are accommodated in each of the slots 20a. Examples of the plural primary conductors 18 include a U-phase coil, a V-phase coil, and a W-phase coil, and each coil is accommodated in the corresponding slot 20a.

The AC currents that are out of phase by 1200 for each phase are supplied from the inverter 7 to the U-phase coil, the V-phase coil, and the W-phase coil. When the AC current is supplied to the primary conductor 18 from the inverter 7, a rotating magnetic field is formed in the primary conductor 18.

The rotor 19 is divided into an outer circumferential rotor section 21 on an outer circumferential side and an inner circumferential rotor section 22 on an inner circumferential side.

The outer circumferential rotor section 21 is substantially ring-shaped when seen in the axial direction, that is, has a substantially ring-shaped cross section in the radial direction. The outer circumferential rotor section 21 is provided with a first through hole 21*a* that penetrates the outer circumferential rotor section 21 in the axial direction. The first through hole 21*a* has an opening shape that is opened in a substantially octagonal shape when seen in the axial direction.

In addition, the outer circumferential rotor section 21 includes an outer circumferential rotor core 23 having plural blocks 21*b*. Each of the blocks 21*b* is formed of a magnetic material such as iron, and is formed to have such a cross-sectional shape that a bottom side of an isosceles trapezoid is an arc when seen in the axial direction. In the outer circumferential rotor core 23, the plural blocks 21*b* are aligned along the circumferential direction at predetermined intervals.

The outer circumferential rotor core 23 includes: plural recessed accommodation sections 23*a*, each of which is recessed radially inward from an outer circumferential surface of the outer circumferential rotor core 23; and plural second through holes 23*b*, each of which is formed to penetrate the outer circumferential rotor core 23 to communicate an inner circumferential surface with the outer circumferential surface. The plural recessed accommodation sections 23*a* and the plural second through holes 23*b* are alternately aligned along the circumferential direction at predetermined intervals.

The inner circumferential rotor section 22 has a substantially octagonal shape when seen in the axial direction, that is, has the substantially octagonal cross section in the radial direction. The inner circumferential rotor section 22 includes an inner circumferential rotor core 24 in which plural electromagnetic steel sheets in a substantially octagonal ring shape are stacked in the axial direction.

A third through hole 24*a* that penetrates the inner circumferential rotor core 24 in the axial direction is formed in a central portion of the inner circumferential rotor core 24. A substantially cylindrical output shaft 25 is inserted through the third through hole 24*a*. The output shaft 25 is provided therein with a cooling passage section 25*a* through which a cooling medium is supplied.

The inner circumferential rotor core 24 (the rotor 19) and the output shaft 25 are coupled to rotate integrally. In this embodiment, a key 27 is fitted into each key groove 26 provided on an inner circumferential surface of the inner circumferential rotor core 24 and an outer circumferential surface of the output shaft 25. In this way, the inner circumferential rotor core 24 (the rotor 19) and the output shaft 25 are coupled in a manner to disable relative rotation to each other.

A substantially annular accommodation space S is provided between the outer circumferential rotor section 21 and the inner circumferential rotor section 22 in the radial direction. The accommodation space S is connected to an inner circumferential end of each of the second through holes 23*b*. The permanent magnet section 28 is accommodated in the accommodation space S.

The permanent magnet section 28 includes plural permanent magnets 29 that extend in the axial direction and are aligned in the circumferential direction. The plural permanent magnets 29 are each formed of a rare earth magnet (such as neodymium magnet or samarium-cobalt magnet). The rare earth magnet has such a property that it is difficult to be demagnetized at a low temperature and is easily demagnetized at a high temperature. That is, the rare earth magnet has an opposite property from a ferrite magnet, is easily demagnetized at the low temperature, and is difficult to be demagnetized at the high temperatures.

Each of the plural permanent magnets 29 has a plate shape and includes an N-pole 29*a* on one side in a thickness direction of the permanent magnet 29 and an S-pole 29*b* on the other side in the thickness direction.

In the accommodation space S, the plural permanent magnets 29 are aligned along the circumferential direction at predetermined intervals. In this embodiment, each of the permanent magnets 29 is disposed at a circumferential position that corresponds to one of eight surfaces constituting an outer circumferential surface of the inner circumferential rotor section 22. Furthermore, each of the plural permanent magnets 29 is in such an orientation that a thickness direction thereof substantially matches the radial direction.

The plural permanent magnets 29 are disposed such that the N-poles 29*a* and the S-poles 29*b* are alternately arranged. In detail, the predetermined permanent magnet 29 has the N-pole 29*a* on the outer circumferential side and the S-pole 29*b* on the inner circumferential side. Meanwhile, the permanent magnet 29 that is adjacent to the predetermined permanent magnet 29 in the circumferential direction has the S-pole 29*b* on the outer circumferential side and the N-pole 29*a* on the inner circumferential side. In this way, on the outer circumferential side of the plural permanent magnets 29, the N-poles 29*a* and the S-poles 29*b* are alternately arranged in the circumferential direction.

A surface on one side in the thickness direction of each of the permanent magnets 29 is in contact with the inner circumferential surface of the outer circumferential rotor section 21. Furthermore, a surface on the other side in the thickness direction of each of the permanent magnets 29 is in contact with the outer circumferential surface of the inner circumferential rotor section 22.

An inner circumferential portion of the second through hole 23*b* and the accommodation space S are filled with a resin material 30. That is, the inner circumferential portion of the second through hole 23*b* and a portion of the accommodation space S where the permanent magnet 29 does not exist are filled with the resin material 30. The outer circumferential rotor section 21, the inner circumferential rotor section 22, and each of the permanent magnets 29 are coupled to each other by the resin material 30.

A cage section 31 is provided on the outer circumferential side of the permanent magnet section 28. In other words, the permanent magnet section 28 is provided on an inner circumferential side of the cage section 31.

The cage section 31 includes plural substantially plate-shaped secondary conductors 32 (secondary coils) and a pair of substantially ring-shaped shortening rings. The plural secondary conductors 32 and the pair of the shortening rings are each formed of a non-magnetic conductor (such as aluminum or copper).

The plural secondary conductors 32 each extend in the axial direction and the radial direction. In addition, the plural secondary conductors 32 are aligned in the circumferential direction, that is, aligned along the circumferential direction at predetermined intervals. Furthermore, the plural secondary conductors 32 each have axial ends that are coupled to the mutually different shortening rings.

A cylindrical cover 33 (made of carbon fiber reinforced plastic, for example) is wound around the outer circumference of the outer circumferential rotor core 23 to prevent rotor shattering. As a result, the outer circumferential rotor section 21, the inner circumferential rotor section 22, and the permanent magnets 28 are coupled to each other firmly.

Figure 4:
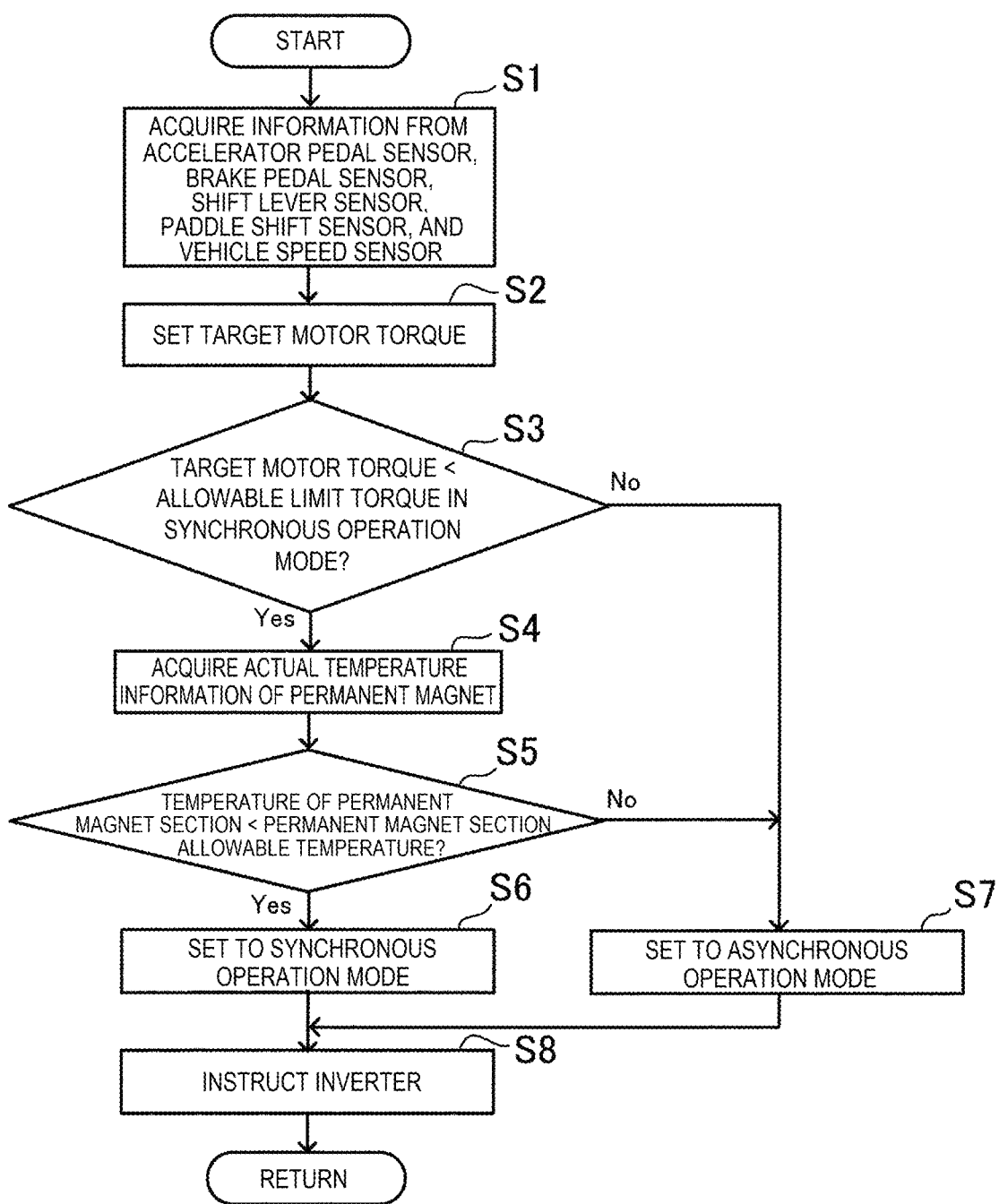
FIG. 4 is a flowchart illustrating an example of control processing by a controller.

Next, a description will be made on an example of the processing in the control program that is executed by the processor 13*a* of the controller/circuitry 13 with reference to FIG. 4.

In step S1, the information transmitted from the accelerator pedal sensor 8, the brake pedal sensor 9, the shift lever sensor 10, the paddle shift sensor 11, and the vehicle speed sensor 12 is acquired.

In step S2, target motor torque is set on the basis of the information acquired in step S1. The target motor torque is motor torque that is requested by the driver of the vehicle 1.

In the case where information indicating that the driver has depressed the accelerator pedal is acquired from the accelerator pedal sensor 8, the target motor torque on a drive side (positive side) for driving the vehicle 1 is set. On the other hand, in the case where information indicating that the driver has depressed the brake pedal is acquired from the brake pedal sensor 9, the target motor torque on a regenerative side (negative side) for decelerating the vehicle 1 is set. Furthermore, the larger target motor torque is set as the accelerator pedal depression amount acquired from the accelerator pedal sensor 8 or the brake pedal depression amount acquired from the brake pedal sensor 9 is increased.

In the case where the shift position information acquired from the shift lever sensor 10 is parking or neutral, the target motor torque is set to 0. Meanwhile, in the case where the shift position information is reverse, drive, or manual, the target motor torque is set to a larger value than 0. In addition, in the case where the shift position information is manual, and the operation to move the shift lever from the reference position is performed, the small target motor torque is set when the shift position information indicates the operation to move the shift lever to the vehicle front side from the reference position (the positive operation information), but the large target motor torque is set when the shift position information indicates the operation to move the shift lever to the vehicle rear side from the reference position (the negative operation information).

Furthermore, in the case where the paddle shift switch operation information acquired from the paddle shift sensor 11 indicates that the paddle shift switch has been operated, the small target motor torque is set when the operation information is the positive operation information, but the large target motor torque is set when the operation information is the negative operation information.

Moreover, in the case where the vehicle speed of the vehicle 1 acquired from the vehicle speed sensor 12 is high, the target motor torque is set to be smaller than the target motor torque in a case where the vehicle speed is not high.

In step S3, it is determined whether the target motor torque of the motor 2 set in step S2 is smaller than allowable limit torque in a predetermined synchronous operation mode. The allowable limit torque is set in advance from a magnetic force of the permanent magnet section 28 that is installed in the motor 2, for example.

If it is determined Yes in step S3, the processing proceeds to step S4. On the other hand, if it is determined No in step S3, the processing proceeds to step S7.

In step S4, the actual temperature information of the permanent magnet section 28 in the motor 2 is acquired from the temperature sensor 15, and then the processing proceeds to step S5.

In step S5, it is determined whether the actual temperature of the permanent magnet section 28 is lower than a permanent magnet section allowable temperature. The permanent magnet section allowable temperature (a predetermined temperature) is set to a temperature that is equal to or higher than 200° C. Celsius (for example, 200° C. Celsius) and is also set to such a temperature that irreversible demagnetization of the permanent magnet section 28 (the permanent magnet 29) possibly occurs when the temperature of the permanent magnet section 28 becomes equal to or higher than the permanent magnet section allowable temperature. Here, the "first temperature" in the claims is a temperature that is lower than the permanent magnet section allowable temperature in the first embodiment. The "second temperature" in the claims is a temperature that is equal to or higher than the permanent magnet section allowable temperature in the first embodiment.

If it is determined Yes in step S5, the processing proceeds to step S6. In step S6, an operation mode of the motor 2 is set to the synchronous operation mode, and then the processing proceeds to step S8.

On the other hand, if it is determined No in step S5, the processing proceeds to step S7.

In step S7 (if it is determined No in step S3, or if it is determined No in step S5), the operation mode of the motor 2 is set to an asynchronous operation mode, and then the processing proceeds to step S8.

In step S8, the inverter 7 is instructed to execute the operation mode set in step S6 or step S7 and to generate the target motor torque set in step S2, and then the processing proceeds to return. Thereafter, the processing is started again from step S1 in FIG. 4. Thus, the processing in FIG. 4 is executed repeatedly. Here, in step S8, in order to generate the target motor torque in the motor 2, a magnetic pole position of the rotor 19 is estimated from the rotation angle information of the rotor 19 that is acquired from the rotation angle sensor 16. Then, with the estimated magnetic pole position being a reference, the inverter 7 is instructed to cause a flow of the AC current of predetermined phase, advance angle position, and magnitude to the primary conductor 18.

In this embodiment, in the case where the synchronous operation mode is set in step S6 while the motor 2 is operated in the asynchronous operation mode, in step S8, the inverter 7 is instructed to switch the asynchronous operation mode to the synchronous operation mode. Meanwhile, in the case where the asynchronous operation mode is set in step S7 while the motor 2 is operated in the synchronous operation mode, in step S8, the inverter 7 is instructed to switch the synchronous operation mode to the asynchronous operation mode.

Next, a description will be made on the synchronous operation mode in which the rotor 19 is rotated using the magnetic force of the permanent magnet section 28 with reference to FIG. 5. The synchronous operation mode is an operation mode in which the rotor 19 is rotated at a rotational speed (a synchronous speed) of the rotating magnetic field. In other words, in the synchronous operation mode, the rotational speed of the rotor 19 matches the rotational speed (the synchronous speed) of the rotating magnetic field.

Figure 5:
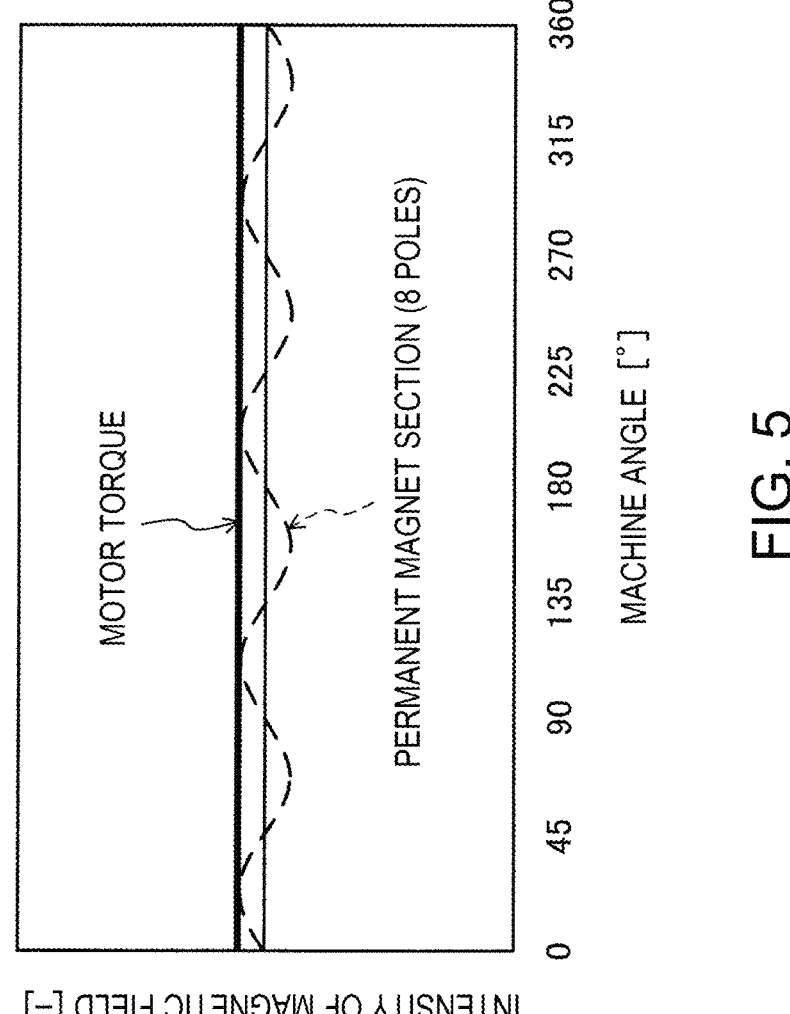
FIG. 5 is a graph illustrating motor torque in a synchronous operation mode.

In FIG. 5, a vertical axis represents intensity of the magnetic field (magnetic flux density [−] of a space corresponding to the intensity of the magnetic field), and a horizontal axis represents a machine angle[°]. In FIG. 5, a broken line represents a characteristic of the intensity of the magnetic field of the permanent magnet section 28 with respect to the machine angle, and a bold solid line represents the motor torque with respect to the machine angle. In this embodiment, since the permanent magnet section 28 includes the eight permanent magnets 29, the number of poles (the number of the N poles and the S poles) of the permanent magnet section 28 is eight.

In the case where the motor 2 is operated in the synchronous operation mode, the AC current is supplied from the inverter 7 to the primary conductor 18 of the stator 17. When the AC current is supplied, the rotating magnetic field is formed in the primary conductor 18. In the synchronous operation mode, the eight magnetic poles (eight poles) are formed in the rotating magnetic field.

In the synchronous operation mode, since the rotor 19 is rotated at the synchronous speed, the rotating magnetic field does not cross the secondary conductor 32 in the cage section 31, that is, a speed difference (slip) is not generated between the rotating magnetic field and the secondary conductor 32. Accordingly, a secondary current (an induced current) does not flow through the secondary conductor 32. Thus, the cage section 31 does not contribute to generation of the motor torque. For this reason, in the synchronous operation mode, a force to rotate the output shaft 25 of the motor 2, that is, the motor torque is generated by the rotating magnetic field and the magnetic field of the permanent magnet section 28. Here, in the synchronous operation mode, as indicated by the bold solid line in FIG. 5, the motor torque is generated by the rotating magnetic field and the magnetic field of the permanent magnet section 28, and there is no other pulsating component. Thus, the motor torque does not pulsate.

Next, a description will be made on the asynchronous operation mode in which the rotor 19 is rotated using the secondary current (the induced current) of the secondary conductor 32 in the cage section 31 with reference to FIG. 6. The asynchronous operation mode is an operation mode in which the rotor 19 is rotated at a different rotational speed from the rotational speed (the synchronous speed) of the rotating magnetic field. In other words, in the asynchronous operation mode, the rotational speed of the rotor 19 does not match the rotational speed (the synchronous speed) of the rotating magnetic field.

Figure 6:
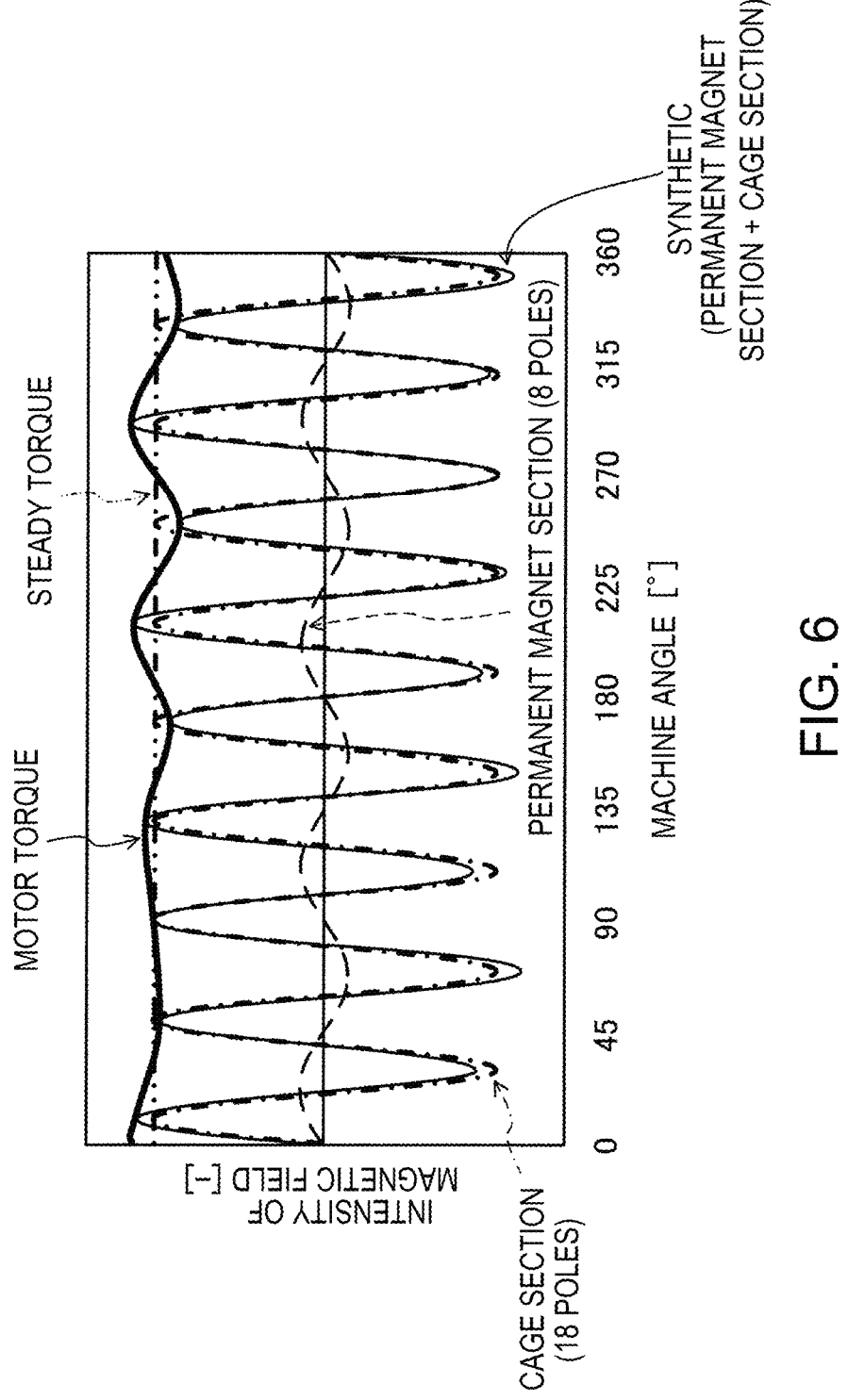
FIG. 6 is a graph illustrating the motor torque in an asynchronous operation mode.

Similar to FIG. 5, in FIG. 6, a vertical axis represents the intensity of the magnetic field (the magnetic flux density [–] of the space corresponding to the intensity of the magnetic field), and a horizontal axis represents the machine angle[°].

In FIG. 6, a broken line represents a characteristic of the intensity of the magnetic field of the permanent magnet section 28 with respect to the machine angle, and a one-dot chain line represents a characteristic of the intensity of the magnetic field of the cage section 31 with respect to the machine angle, a solid line represents a characteristic of intensity of a synthetic magnetic field (the permanent magnet section 28 and the cage section 31) with respect to the machine angle, a bold solid line represents the motor torque with respect to the machine angle, and a two-dot chain line represents steady torque (the motor torque generated solely by the magnetic field of the cage section 31) with respect to the machine angle.

In the case where the motor 2 is operated in the asynchronous operation mode, similar to the synchronous operation mode, the AC current is supplied from the inverter 7 to the primary conductor 18 of the stator 17. When the AC current is supplied, the rotating magnetic field is formed in the primary conductor 18. In the asynchronous operation mode, the 18 magnetic poles are formed in the rotating magnetic field. However, in this embodiment, the inverter 7 can appropriately change the number of the magnetic poles (the number of poles) in the rotating magnetic field of the stator 17 by changing a direction of the current flowing through each of the plural primary conductors 18 and increasing/reducing the number of the primary conductors 18 in a group in which the current flows in the same direction and the primary conductors 18 are aligned continuously in the circumferential direction.

In the asynchronous operation mode, since the rotor 19 is rotated at a different speed (an asynchronous speed) from the synchronous speed, the rotating magnetic field crosses the secondary conductor 32 in the cage section 31, that is, the speed difference (the slip) is generated between the rotating magnetic field and the secondary conductor 32. As a result, the secondary current (the induced current) flows through the secondary conductor 32. Thus, the 18 magnetic poles (18 poles), the number of which is the same as the number of the magnetic poles in the rotating magnetic field of the stator 17, are formed in the cage section 31 (the rotor 19) (see FIG. 6).

In addition, in the asynchronous operation mode, similar to the synchronous operation mode, the magnetic field of the permanent magnet section 28 acts in the motor 2. As illustrated in FIG. 6, the eight magnetic poles (eight poles) are formed in the magnetic field of the permanent magnet section 28. Thus, in the asynchronous operation mode, the magnetic field formed by the permanent magnet section 28 and the magnetic field formed by the cage section 31 are synthesized (see the solid line in FIG. 6).

In this embodiment, since the number of the poles (8 poles) in the magnetic field by the permanent magnet section 28 does not match the number of the poles (18 poles) in the magnetic field by the cage section 31, a cycle of the intensity of the magnetic field of the permanent magnet section 28 with respect to the machine angle differs from a cycle of the intensity of the magnetic field of the cage section 31. In other words, the magnetic field of the permanent magnet section 28 and the magnetic field of the cage section 31 generate a phase difference. As a result, the intensity of the synthetic magnetic field, which is formed by the permanent magnet section 28 and the cage section 31, pulsates. In this embodiment, since the intensity of the magnetic field by the cage section 31 is greater than the intensity of the magnetic field by the permanent magnet section 28, the intensity of the magnetic field by the permanent magnet section 28 serves as a component that causes the pulsation of the intensity of the synthetic magnetic field.

Since the intensity of the synthetic magnetic field pulsates, the motor torque, which is generated by the synthetic magnetic field and the rotating magnetic field, pulsates (see the bold solid line in FIG. 6). In other words, the motor torque does not match the steady torque (see the two-dot chain line in FIG. 6), which is generated solely by the magnetic field of the cage section 31, and pulsates (fluctuates) as indicated by the bold solid line in FIG. 6. When the motor torque pulsates, an angular velocity of the output shaft 25 of the motor 2 fluctuates like a crankshaft in an engine during combustion. This enables spurious generation of the angular velocity fluctuation like the engine with the motor 2.

The angular velocity fluctuation of the output shaft 25 of motor 2, that is, vibration of the motor 2 is transmitted from the motor 2 to the vehicle 1. The driver of the vehicle 1 can grasp the operation state of the motor 2 from the vibration of the motor 2 that is transmitted to a cabin. In this way, it is possible to prevent the driver, who is accustomed to driving the vehicle (an engine car) on which the engine is mounted, from feeling a sense of discomfort due to a fact that the driver cannot grasp the operation state of the motor 2 from the vibration of the motor 2 transmitted to the cabin when the driver drives the vehicle 1 (the electric car) on which the motor 2 is mounted.

Next, a description will be made on states of the rotating magnetic field of the stator 17 in the synchronous operation mode and the asynchronous operation mode with reference to FIG. 7 and FIG. 8.

Figure 7:
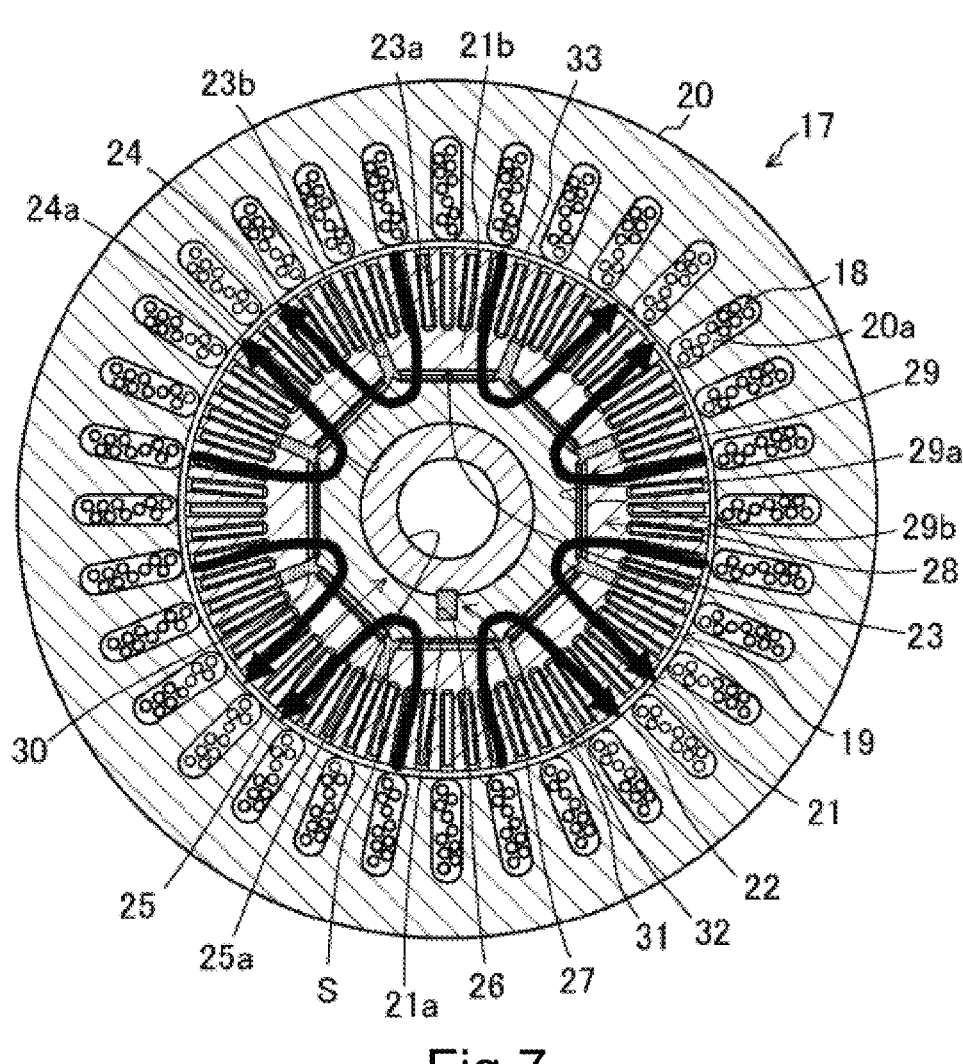
FIG. 7 is a schematic cross-sectional view illustrating a state of a rotating magnetic field in the synchronous operation mode.

FIG. 7 illustrates a state of magnet lines of the rotating magnetic field in the synchronous operation mode. In the synchronous operation mode, the magnetic force of the rotating magnetic field is not converted to the secondary current (the induced current) in the cage section 31 (the secondary conductor 32) located on the outer circumferential side. Thus, the magnetic force of the rotating magnetic field that acts on the permanent magnet section 28 located on the inner circumferential side is relatively large.

Figure 8:
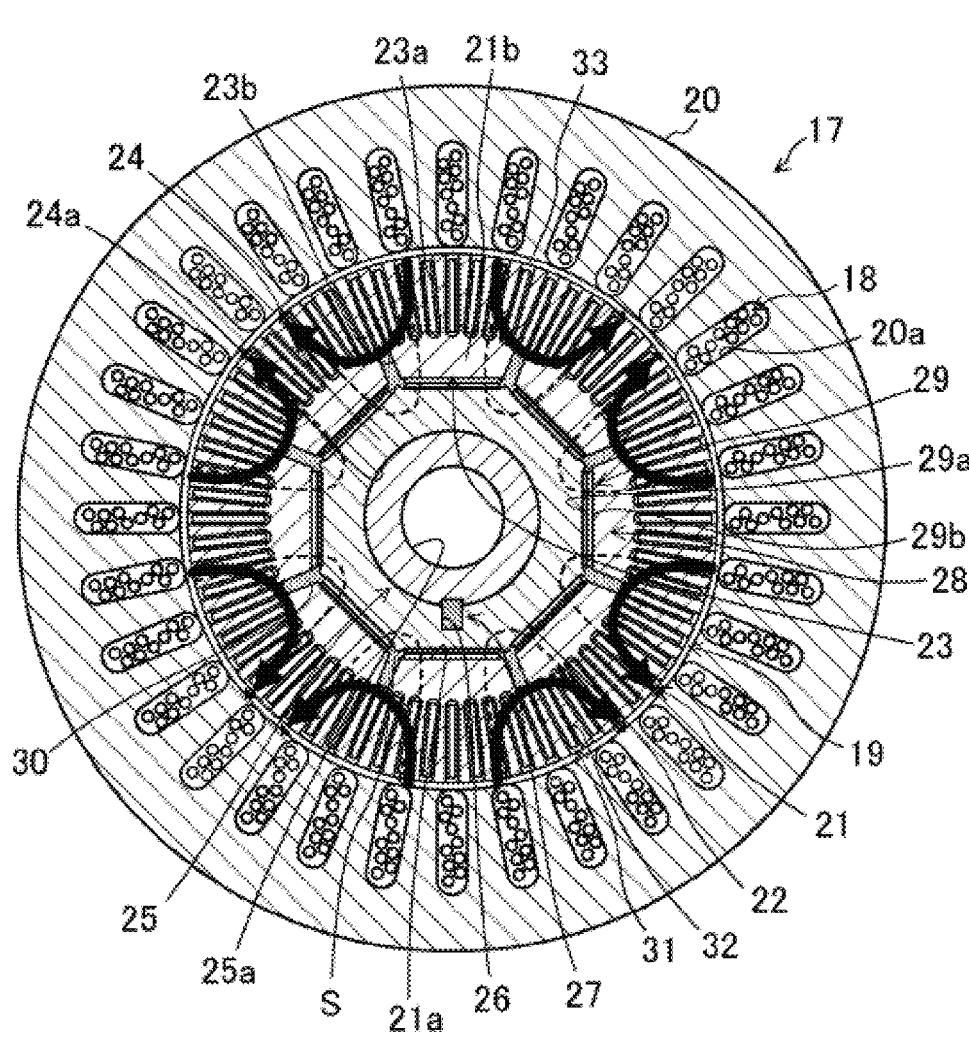
FIG. 8 is a schematic cross-sectional view illustrating the state of the rotating magnetic field in the asynchronous operation mode.

FIG. 8 illustrates a state of magnet lines of the rotating magnetic field in the asynchronous operation mode. In the asynchronous operation mode, a large part of the magnetic force of the rotating magnetic field is converted to the secondary current (the induced current) in the cage section 31 (the secondary conductor 32) located on the outer circumferential side, and the remaining minute magnetic force acts on the permanent magnet section 28 located on the inner circumferential side. Thus, the magnetic force of the rotating magnetic field that acts on the permanent magnet section 28 is relatively small, that is, becomes smaller than that in the synchronous operation mode.

Here, as the magnetic force of the rotating magnetic field acting on the permanent magnet section 28 is increased, loss by an eddy current generated in the permanent magnet section 28 is also increased, and the temperature of the permanent magnet section 28 is likely to be increased. As described above, in the asynchronous operation mode, since the magnetic force of the rotating magnetic field acting on the permanent magnet section 28 is smaller than that in the synchronous operation mode, the eddy current can be suppressed. Thus, in the asynchronous operation mode, since the temperature of the permanent magnet section 28 is less likely to be increased by the eddy current than that in the synchronous operation mode, it is possible to suppress the irreversible demagnetization of the permanent magnet section 28.

As it has been described so far, according to the first embodiment, when the temperature of the permanent magnet section 28 is relatively high, the asynchronous operation mode is executed. In the asynchronous operation mode, the magnetic force of the rotating magnetic field of the stator 17 is used to generate the secondary current (the induced current) in the cage section 31, which is located on the outer circumferential side of the permanent magnet section 28, and is unlikely to act on the permanent magnet section 28, which is located on the inner circumferential side of the cage section 31. That is, in the asynchronous operation mode, the magnetic force of the rotating magnetic field acting on the permanent magnet section 28 is smaller than that in the synchronous operation mode. In this way, it is possible to suppress the generation of the eddy current in the permanent magnet section 28. Thus, it is possible to suppress the permanent magnet section 28 from reaching the high temperature and being demagnetized by the eddy current.

When the temperature of the permanent magnet section 28 is increased in the synchronous operation mode, the mode can be switched to the asynchronous operation mode. As a result, the synchronous operation mode continues, and it is thus possible to suppress the permanent magnet section 28 from reaching the high temperature and being demagnetized by the eddy current.

When the temperature of the permanent magnet section 28 is reduced in the asynchronous operation mode, the mode can be switched to the synchronous operation mode. In this way, it is possible to execute the synchronous operation mode, in which the demagnetization of the permanent magnet section 28 caused by the eddy current is suppressed and the loss is suppressed when compared to that in the asynchronous operation mode.

A pump is connected to the cooling passage section 25a provided in the output shaft 25. When the pump is actuated, the cooling medium is supplied to the cooling passage section 25a, and the permanent magnet section 28 is cooled from the inner circumferential side thereof by the cooling medium. This can suppress the permanent magnet section 28 from reaching the high temperature.

Second Embodiment

Figure 9:
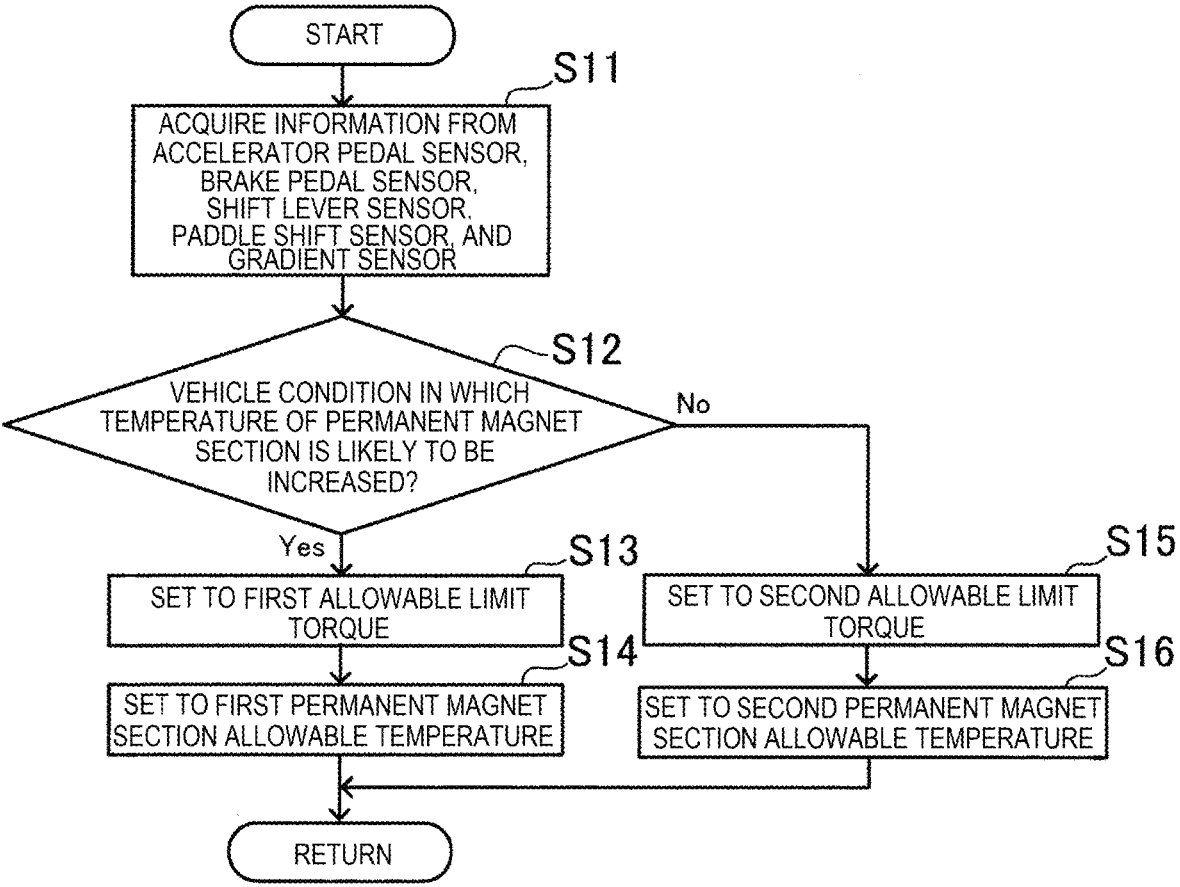
FIG. 9 is a flowchart illustrating an example of control processing by a controller according to a second embodiment of the disclosure.

Next, a description will be made on a second embodiment of the disclosure. In the second embodiment, the control program for executing the processing illustrated in FIG. 4 and FIG. 9 is stored in the memory 13b. The processor 13a in the controller/circuitry 13 is configured to execute the processing illustrated in FIG. 4 and FIG. 9 on the basis of the control program stored in the memory 13b. In the second embodiment, after the processing illustrated in FIG. 9 is executed, the processing illustrated in FIG. 4 is executed. In the second embodiment, since the processing illustrated in FIG. 4 is common to the first embodiment, only the processing illustrated in FIG. 9 will be described.

In step S11 of FIG. 9, the information transmitted from the accelerator pedal sensor 8, the brake pedal sensor 9, the shift lever sensor 10, the paddle shift sensor 11, and the gradient sensor 34 is acquired.

In step S12, based on each piece of the information acquired in step S11, it is determined whether the vehicle is in a state where the temperature of the permanent magnet section 28 is likely to be increased.

In step S12, based on the information acquired from the accelerator pedal sensor 8, the brake pedal sensor 9, the shift lever sensor 10, and the paddle shift sensor 11, in the case where at least one of the operation amounts of the accelerator pedal, the brake pedal, the shift lever, and the paddle shift switch, operation speeds thereof, and the number of operations thereof in a predetermined period is equal to or greater than a predetermined value, it is determined that the vehicle is in the state where the temperature of the permanent magnet section 28 is likely to be increased. This is because it can be predicted that, when an operation amount of a vehicle driving operation by the driver of the vehicle 1 is relatively large, when the operation speed is relatively high, or when the number of the operations is relatively large, there is a high possibility that the motor torque fluctuates rapidly and the temperature of the motor 2 is increased rapidly.

In addition, in step S12, based on the information acquired from the gradient sensor 34, in the case where the vehicle 1 is traveling on a road, a road surface of which is ascending or descending by a predetermined degree of the gradient or greater, it is determined that the vehicle is in the state where the temperature of the permanent magnet section 28 is likely to be increased. When the vehicle 1 is traveling on the road, the road surface gradient of which is an ascending gradient (an uphill road) by the predetermined degree or greater or a descending gradient (a downhill road) by the predetermined degree or greater, for example, a load on the motor 2 that drives the vehicle 1 is relatively high, that is, the motor torque is relatively high. Thus, it is possible to predict that there is the high possibility that the temperature of the motor 2 is increased rapidly.

If it is determined Yes in step S12, the processing proceeds to step S13. In step S13, the allowable limit torque is set to first allowable limit torque, and then the processing proceeds to step S14. In step S14, the permanent magnet section allowable temperature is set to a first permanent magnet section allowable temperature, and then the processing proceeds to return.

On the other hand, if it is determined No in step S12, the processing proceeds to step S15. In step S15, the allowable limit torque is set to second allowable limit torque, and then the processing proceeds to step S16. In step S16, the permanent magnet section allowable temperature is set to a second permanent magnet section allowable temperature, and then the processing proceeds to return.

The first allowable limit torque is set to be lower than the second allowable limit torque. The first permanent magnet section allowable temperature is set to be lower than the second permanent magnet section allowable temperature.

As it has been described so far, in the vehicle state where the temperature of the permanent magnet section 28 is likely to be increased, the first allowable limit torque, which is lower than the second allowable limit torque, and the first permanent magnet section allowable temperature, which is lower than the second permanent magnet section allowable temperature, are set. Accordingly, it is likely to be determined No in step S3 or step S5 of FIG. 4. In this way, in the vehicle driving condition in which the temperature of the permanent magnet section 28 is likely to be increased, the asynchronous operation mode is likely to be executed. As a result, it is possible to suppress the temperature increase of the permanent magnet section 28 due to the eddy current. Thus, it is possible to suppress the permanent magnet section 28 from reaching the high temperature and being demagnetized.

When the vehicle 1 is traveling on the uphill road or the downhill road, that is, in a situation where the motor torque is relatively large and the motor 2 is likely to generate heat, the permanent magnet section allowable temperature (the predetermined temperature) is set to be low. This facilitates the execution of the asynchronous operation mode, in which the eddy current can be suppressed when compared to the synchronous operation mode, in a vehicle travel scene in which the temperature of the motor 2 is likely to become high. Thus, it is possible to suppress the permanent magnet section 28 from reaching the high temperature and being demagnetized by the eddy current.

In addition, for example, in a situation where the vehicle driving operation amount such as the accelerator pedal operation amount by the driver is relatively large and the motor torque possibly fluctuates rapidly, the permanent magnet section allowable temperature (the predetermined temperature) is set to be low. This facilitates the execution of the asynchronous operation mode, in which the eddy current can be suppressed when compared to the synchronous operation mode, in the vehicle travel scene in which the temperature of the motor 2 is likely to become high. Thus, it is possible to suppress the permanent magnet section 28 from reaching the high temperature and being demagnetized by the eddy current.

Modified Examples of Second Embodiment

In the second embodiment, the description has been made on the example in which the first allowable limit torque, the second allowable limit torque, the first permanent magnet section allowable temperature, and the second permanent magnet section allowable temperature are set. However, the single allowable limit torque and the single permanent magnet section allowable temperature may be changed according to whether the vehicle is in the state where the temperature of the permanent magnet section 28 is likely to be increased.

In addition, in the second embodiment, the description has been made on the example in which the first allowable limit torque, the second allowable limit torque, the first permanent magnet section allowable temperature, and the second permanent magnet section allowable temperature are set. However, only the first allowable limit torque and the second allowable limit torque may be set (the first permanent magnet section allowable temperature and the second permanent magnet section allowable temperature are not set), or only the first permanent magnet section allowable temperature and the second permanent magnet section allowable temperature may be set (the first allowable limit torque and the second allowable limit torque are not set).

In the second embodiment, the gradient information is acquired from the gradient sensor 34 in step S11. However, the road surface gradient may be calculated from the acceleration information acquired from the acceleration sensor 35, or the gradient information may be acquired from the navigation system 37. In the case where the gradient information may be acquired from the navigation system 37, in the second embodiment, the gradient information (map information) at the current location of the vehicle 1 by the navigation system 37 is used. However, the gradient information (the map information) may be acquired in advance on the basis of a planned future travel route. In this way, the motor 2 can be controlled in advance according to the gradient information (the map information) of the planned future travel route.

In the second embodiment, an example of using the acceleration information by the acceleration sensor 35 is not described. However, in the case where the acceleration information is acquired from the acceleration sensor 35 in step S11, and loaded weight of the vehicle 1, which is estimated from the acceleration information (actual vehicle acceleration information) in step S12, is equal to or greater than predetermined weight, it may be determined that the vehicle is in the state where the temperature of the permanent magnet section 28 is likely to be increased. The loaded weight of the vehicle 1 is estimated on the basis of a difference between target vehicle acceleration information, which is set in advance on the basis of the motor torque, and the acceleration information (the actual vehicle acceleration information).

In the second embodiment, an example of using the towing information by the towing sensor 36 is not described. However, in the case where the towing information is acquired from the towing sensor 36 in step S11, and the vehicle 1 is towing another vehicle or the like in step S12, it may be determined that the vehicle is in the state where the temperature of the permanent magnet section 28 is likely to be increased.

Modified Examples of First Embodiment and
Second Embodiment

In the first and second embodiments, the inner circumferential rotor section 22 is in the substantially octagonal shape when seen in the axial direction. However, the inner circumferential rotor section 22 may be in a polygonal shape other than the substantially octagonal shape (such as a substantially hexagonal shape, a substantially heptagonal shape, a substantially enneagonal shape, a substantially decagonal shape, or a substantially dodecagonal shape).

In the first and second embodiments, the permanent magnet 29 has the plate shape. However, the permanent magnet 29 may be in a shape other than the plate shape (such as an arc shape).

In the first and second embodiments, the description has been made on the example in which the number of the poles in the permanent magnet section 28 is 8. However, the number of poles in the permanent magnet section 28 may be other than 8 (such as 4, 6, 10, or 12 poles).

In the first and second embodiments, the description has been made on the example in which the secondary conductor 32 in the cage section 31 has the plate shape. However, the secondary conductor 32 may have a shape other than the plate shape (such as a rod shape).

In the first and second embodiments, the actual temperature of the permanent magnet section 28 in the motor 2 is detected by the temperature sensor 15. However, the temperature of the permanent magnet section 28 may be estimated on the basis of travel history of the vehicle 1, history of the AC current supplied from the inverter 7 to the primary conductor 18, or the like.

In the first and second embodiments, the motor torque pulsates in the asynchronous operation mode. However, the magnetic field of the permanent magnet section 28 may be cancelled out by forming a magnetic field in an opposite phase to the magnetic field of the permanent magnet section 28 (see a dotted line in FIG. 10), and the pulsation of the motor torque may thereby be eliminated. Here, The magnetic field in the opposite phase is formed by the primary conductor 18 of the stator 17, and is generated by superimposing a current, which generates torque in an opposite phase from the pulsation component generated by the magnetic field of the permanent magnet section 28, on the current for driving the motor 2 and supplying the superimposed current to the primary conductor 18. The pulsation of the motor torque may be reduced by forming the magnetic field in the opposite phase in a manner that the magnetic field of some of the permanent magnet section 28 partially remains, rather than completely canceling out the magnetic field of the permanent magnet section 28 by the magnetic field in the opposite phase. In this way, in such a scene that the driver or an occupant of the vehicle 1 does not desire the pulsation of the motor torque (for example, a case where neither the driver nor the occupant is accustomed to the vehicle on which the engine is mounted, or the like), it is possible to eliminate (see the bold solid line in FIG. 10) or reduce the pulsation of the motor torque.

In the first and second embodiments, in the asynchronous operation mode, the inverter 7 forms the rotating magnetic field with the 18 poles using the primary conductors 18 of the stator 17. However, the rotating magnetic field with the poles other than the 18 poles (such as 6, 8, 12, 14, or 16 poles) may be formed. In the case where the motor torque is made to pulsate using the pulsating component generated by the magnetic field in the permanent magnet section 28, the number of the poles in the permanent magnet section 28 preferably differs from the number of the poles in the rotating magnetic field of the stator 17, that is, the number of the poles in the cage section 31.

Figure 11:
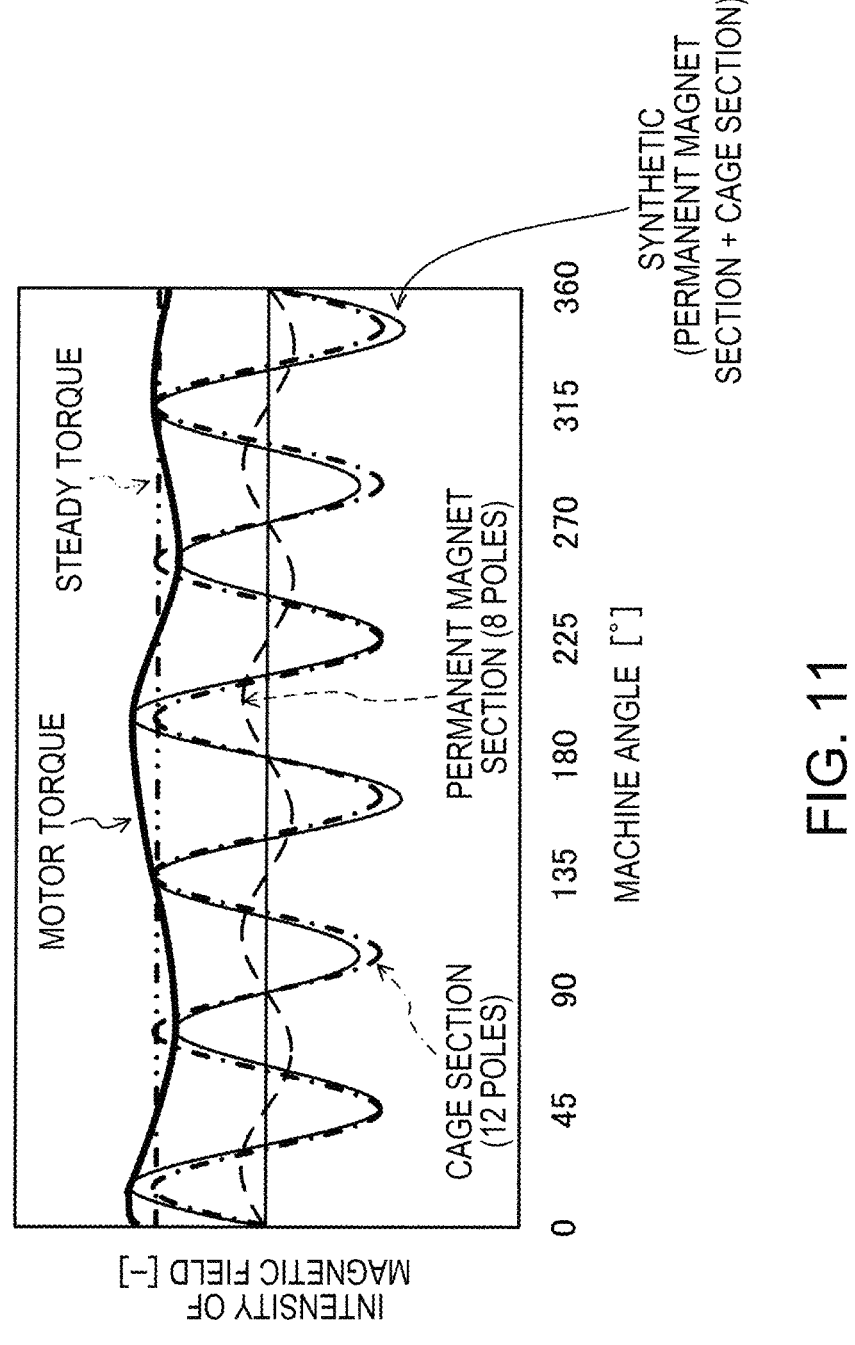
FIG. 11 is a graph corresponding to FIG. 6 according to the modified example.

FIG. 11 illustrates an example of the asynchronous operation mode in which the number of the poles in the rotating magnetic field is 12. As illustrated in FIG. 11, also in the cage section 31, 12 magnetic poles, the number of which is the same as that in the rotating magnetic field, are formed. In this embodiment, since the number of the poles (8 poles) in the magnetic field by the permanent magnet section 28 does not match the number of the poles (12 poles) in the magnetic field by the cage section 31, the cycle of the intensity of the magnetic field of the permanent magnet section 28 with respect to the machine angle differs from the cycle of the intensity of the magnetic field of the cage section 31. As a result, a synthetic magnetic field, which is indicated by a solid line in FIG. 11 and is formed by both of the above magnetic fields, pulsates. Accordingly, the motor torque generated by the synthetic magnetic field, which is formed by the permanent magnet section 28 and the cage section 31, and the rotating magnetic field pulsates (see the bold solid line in FIG. 11). Here, in the modified example illustrated in FIG. 11, for example, a cycle of the motor torque, that is, a frequency of the pulsation of the motor torque is less than that in the first embodiment illustrated in FIG. 6. Thus, by changing the number of the poles in the magnetic field by the cage section 31 (the number of the poles in the rotating magnetic field), the frequency of the pulsation of the motor torque can be changed. By changing the number of the poles by the cage section 31 as appropriate, in other words, by appropriately changing a difference between the number of the poles by the permanent magnet section 28 and the number of the poles by the cage section 31 as appropriate, it is possible to change a magnitude of the pulsation of the motor torque, or the magnitude and the frequency of the pulsation of the motor torque.

Figure 12:
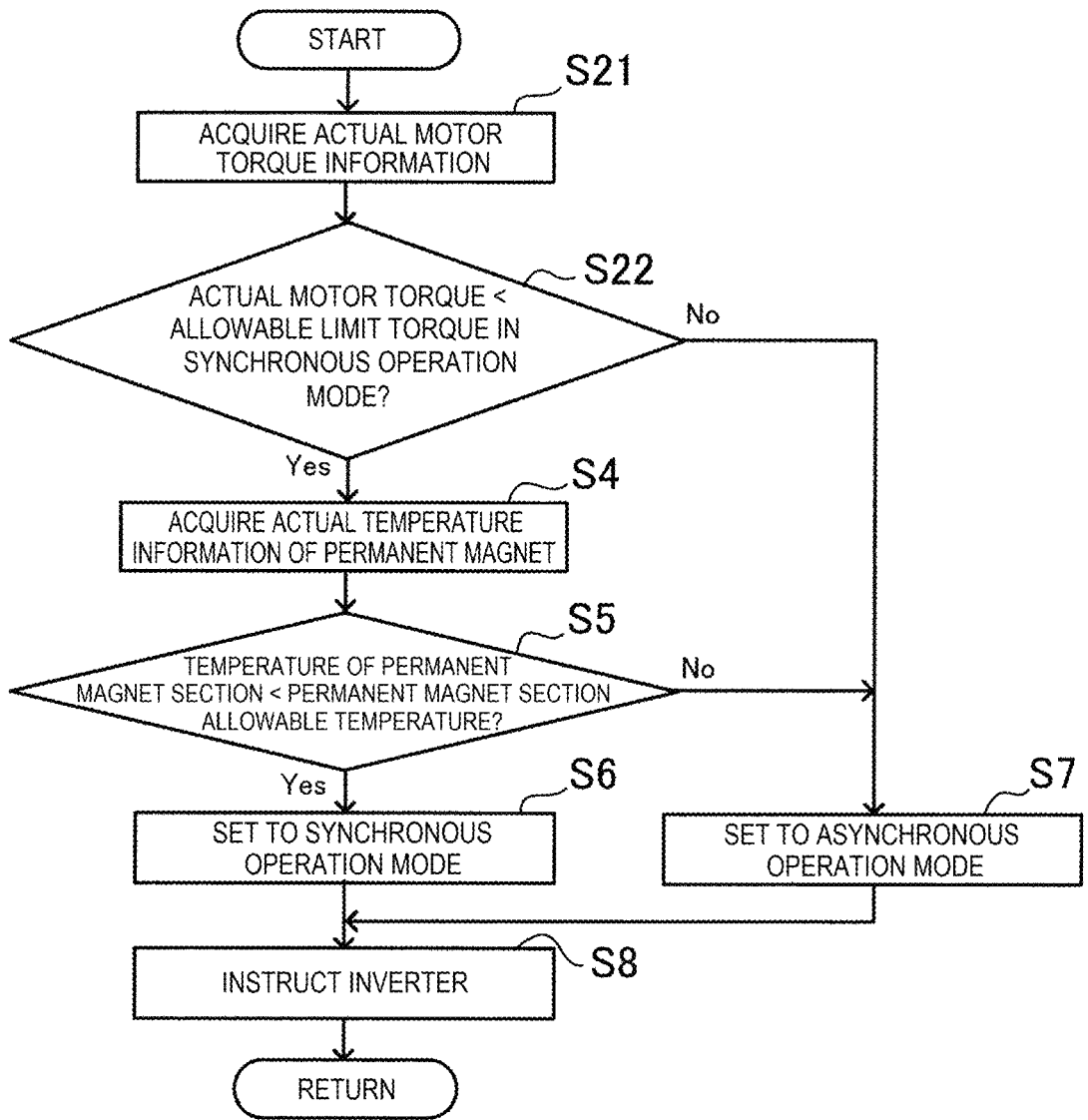
FIG. 12 is a graph corresponding to FIG. 4 according to a modified example.

In the first and second embodiments, the operation mode of the motor 2 is set on the basis of the target motor torque. However, as illustrated in a modified example of FIG. 12, the operation mode of the motor 2 may be controlled on the basis of the actual motor torque. In the modified example illustrated in FIG. 12, steps S1 to S3 in FIG. 4 are replaced with steps S11 to S12.

Figure 10:
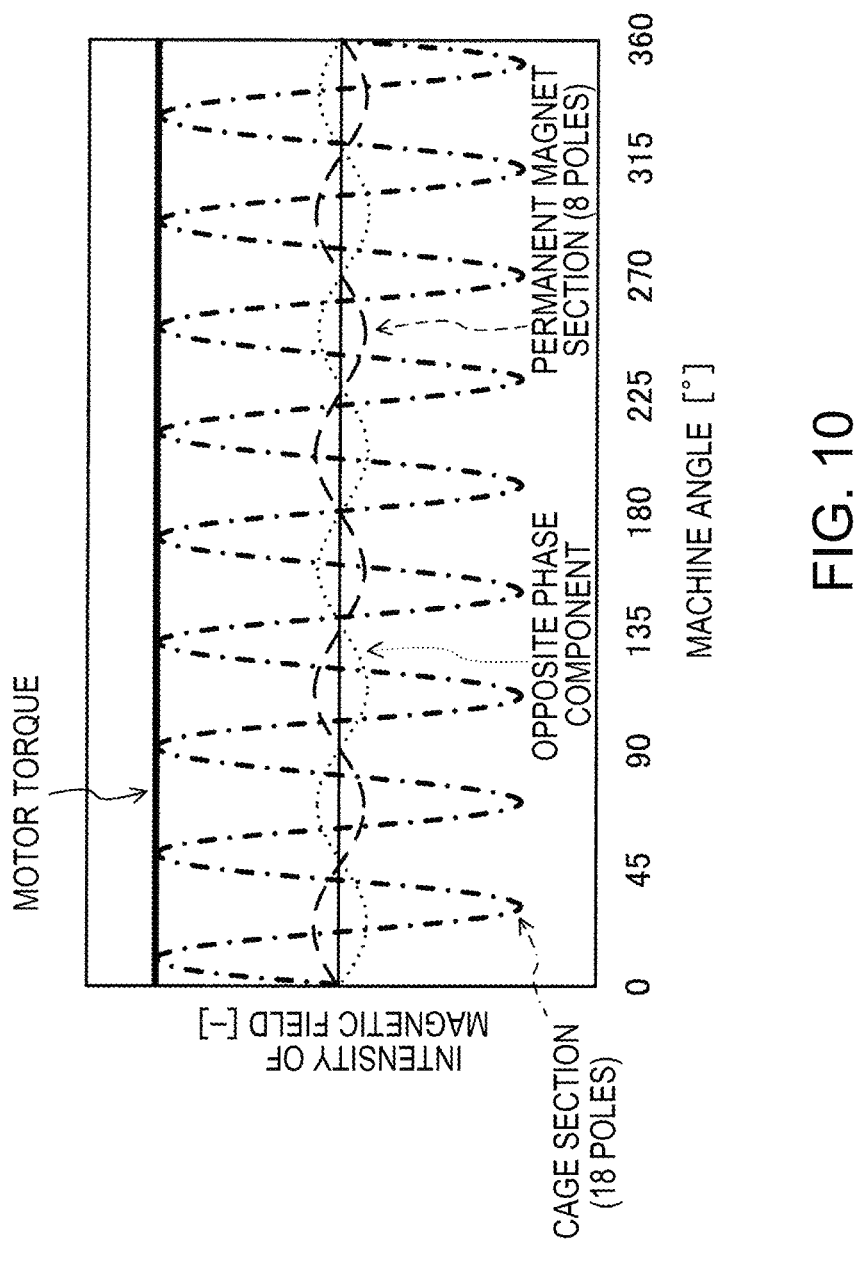
FIG. 10 is a graph corresponding to FIG. 6 according to a modified example.

In step S11 of FIG. 10, the actual motor torque information of the motor 2 is acquired from the torque sensor 14. In step S12, it is determined whether the actual motor torque information acquired in step S11 is lower than the allowable limit torque in the predetermined synchronous operation mode. Then, if it is determined Yes in step S12, the processing proceeds to step S4. However, if it is determined No in step S12, the processing proceeds to step S7. Here, since the processing in steps S4 to S8 is the same as that in FIG. 4, the description thereon will not be made.

In the first embodiment and the second embodiment, the operation mode (the synchronous operation mode or the asynchronous operation mode) is set on the basis of the target motor torque and the temperature of the permanent magnet section 28. However, the operation mode may be set on the basis of either the target motor torque or the temperature of the permanent magnet section 28. Furthermore, the operation mode of the motor 2 may be set on the basis of the rotational speed of the motor 2 (acquired by the rotation angle sensor 16), instead of the target motor torque or the temperature of the permanent magnet section 28, or in addition to the target motor torque and the temperature of the permanent magnet section 28. For example, in the case where the rotational speed of the motor 2 is equal to or higher than a predetermined rotational speed, the asynchronous operation mode may be set. On the other hand, in the case where the rotational speed of the motor 2 is lower than the predetermined rotational speed, the synchronous operation mode may be set. As a result, the asynchronous operation mode is executed in a high speed range of the motor 2. Thus, it is possible to suppress a reduction in the motor torque due to an influence of the back EMF, which is increased in the high speed range of the motor 2, in the permanent magnet section 28. Furthermore, the vehicle speed information acquired from the vehicle speed sensor 12 may be used instead of the rotational speed of the motor 2. In this case, for example, the asynchronous operation mode is set when the vehicle speed of the vehicle 1 is equal to or higher than a predetermined speed. On the other hand, the synchronous operation mode may be set when the vehicle speed of the vehicle 1 is lower than the predetermined speed.

In the first and second embodiments, the example in which the motor 2 only drives the front wheels FW. However, the motor 2 may drive the front wheels FW and the rear wheels RW or may only drive the rear wheels RW. Alternatively, the plural motors 2 may be provided to separately drive the front wheels FW and the rear wheels RW.

In the first and second embodiments, the example of the electric vehicle is described as the example of the vehicle 1. However, the vehicle 1 may be any electric vehicle and may be a hybrid vehicle including the motor 2 and the engine, for example.

In the first and second embodiments, the four-wheeled vehicle is described as the example of the vehicle 1. However, the vehicle 1 may be a three-wheeled vehicle, a two-wheeled vehicle, or an agricultural vehicle (such as a tractor) that can travel on land.

INDUSTRIAL APPLICABILITY

The disclosure is suited for vehicle drive systems.

DESCRIPTION OF REFERENCE SIGNS AND NUMERALS

1: VEHICLE
2: MOTOR
5: VEHICLE DRIVE SYSTEM
13: CONTROLLER/CIRCUITRY (CONTROL SECTION)
17: STATOR
19: ROTOR
28: PERMANENT MAGNET SECTION
31: CAGE SECTION
FW: FRONT WHEEL (DRIVE WHEEL)

The invention claimed is:

1. A vehicle drive system comprising:
a motor that has a cylindrical stator and a cylindrical rotor provided in the stator to be coaxially rotatable with a center axis of the stator and that drives a drive wheel of a vehicle by rotation of the rotor,
the rotor having a cage section and a permanent magnet section provided on an inner circumferential side of the cage section and formed of a rare earth magnet,
circuitry configured to execute a synchronous operation mode when a temperature of the permanent magnet section is lower than a predetermined temperature, and execute an asynchronous operation mode when the temperature of the permanent magnet section is equal to or higher than the predetermined temperature, in the synchronous operation mode, the rotor being rotated by using a magnetic force of the permanent magnet section, and in the asynchronous operation mode, the rotor being rotated by using an induced current generated in the cage section.

2. The vehicle drive system according to claim 1, wherein when the vehicle is traveling on an uphill road or a downhill road, the circuitry reduces the predetermined temperature to be lower than that when the vehicle is not traveling on the uphill road or the downhill road.

3. The vehicle drive system according to claim 2, wherein the circuitry changes the predetermined temperature based on a vehicle driving operation by a driver of the vehicle.

4. The vehicle drive system according to claim 2, wherein when the temperature of the permanent magnet section becomes equal to or higher than the predetermined temperature in the synchronous operation mode, the circuitry switches the synchronous operation mode to the asynchronous operation mode.

5. The vehicle drive system according to claim 2, wherein when the temperature of the permanent magnet section becomes lower than the predetermined temperature in the asynchronous operation mode, the circuitry switches the asynchronous operation mode to the synchronous operation mode.

6. The vehicle drive system according to claim 1, wherein the circuitry changes the predetermined temperature based on a vehicle driving operation by a driver of the vehicle.

7. The vehicle drive system according to claim 1, wherein when the temperature of the permanent magnet section becomes equal to or higher than the predetermined temperature in the synchronous operation mode, the circuitry switches the synchronous operation mode to the asynchronous operation mode.

8. The vehicle drive system according to claim 1, wherein when the temperature of the permanent magnet section becomes lower than the predetermined temperature in the asynchronous operation mode, the circuitry switches the asynchronous operation mode to the synchronous operation mode.

9. A vehicle drive system comprising:
a motor that has a cylindrical stator and a cylindrical rotor provided in the stator to be coaxially rotatable with a center axis of the stator and that drives a drive wheel of a vehicle by rotation of the rotor,
the rotor having a cage section and a permanent magnet section provided on an inner circumferential side of the cage section and formed of a rare earth magnet,
circuitry configured to execute a synchronous operation mode when a temperature of the permanent magnet section is a first temperature, and execute an asynchronous operation mode when the temperature of the permanent magnet section is a second temperature that is higher than the first temperature, in the synchronous operation mode, the rotor being rotated by using a magnetic force of the permanent magnet section, and in the asynchronous operation mode, the rotor being rotated by using an induced current generated in the cage section.

\* \* \* \* \*